United States Patent [19]

Onoue et al.

[11] 4,200,711

[45] Apr. 29, 1980

[54] PROCESS FOR PREPARING FLUORINE-CONTAINING POLYMERS HAVING CARBOXYL GROUPS

[75] Inventors: Yasuharu Onoue, Tokyo; Toshikatsu Sata, Tokuyama; Akihiko Nakahara, Tokuyama; Junichi Itoh, Tokuyama, all of Japan

[73] Assignee: Tokuyama Soda Kabushiki Kaisha, Yamaguchi, Japan

[21] Appl. No.: 898,950

[22] Filed: Apr. 21, 1978

[30] Foreign Application Priority Data

Apr. 25, 1977 [JP] Japan .................................. 52/46861
Dec. 19, 1977 [JP] Japan ................................. 52/152694

[51] Int. Cl.$^2$ ............................................. C08F 8/06
[52] U.S. Cl. .................................. 525/387; 525/388; 525/343; 525/344
[58] Field of Search ....................... 526/57, 58, 30, 31

[56] References Cited

U.S. PATENT DOCUMENTS

4,075,184  2/1978  Rechlicz ................................. 526/30

FOREIGN PATENT DOCUMENTS

52-24177  2/1977  Japan .
765608  12/1953  United Kingdom ...................... 526/58

*Primary Examiner*—William F. Hamrock
*Attorney, Agent, or Firm*—Sherman & Shalloway

[57] ABSTRACT

A process for preparing a fluorine-containing polymer having carboxyl groups, which comprises subjecting a fluorine-containing polymer having sulfonyl halide groups bonded to it to an oxidation reaction at a temperature of not more than 250° C.; and a process for electrolysis, using as a diaphragm a member of the polymer obtained by the above process.

13 Claims, 2 Drawing Figures

PROCESS FOR PREPARING FLUORINE-CONTAINING POLYMERS HAVING CARBOXYL GROUPS

FIELD OF THE INVENTION

This invention relates to a process for preparing with good efficiency a fluorine-containing polymer having carboxyl groups by subjecting a fluorine-containing polymer having sulfonyl halide groups bonded to it to an oxidation reaction.

BACKGROUND OF THE INVENTION

Fluorine-containing polymers have low surface energy and outstandingly high oxidation resistance and chemical resistance and other properties which are different from those of hydrocarbon-type polymers. Thus, these properties are arousing much research and development interest in fluorine-containing polymers.

On the other hand, extensive work has been done in recent years on ion exchange membrane for use as diaphragms in the electrolysis of alkali metal salts. These ion exchange membranes are required to have satisfactory resistance to alkali metal hydroxides kept at high temperatures and present in high concentrations and nascent-state halogen gases and oxygen gas, as well as a very high level of performance. To meet these requirements, ion exchange membranes composed of a sulfo-containing perfluorocarbon polymer were suggested. These ion exchange membranes are manufactured by E. I. du Pont de Nemours & Co. and sold under the trademark NAFION. Ion exchange membranes of perfluorocarbon polymers having sulfo groups as sole ion exchange groups have the defect that when they are used as electrolytic diaphragms in the electrolysis of alkali metal salts, they suffer from a low current efficiency. It is known that this defect can be effectively remedied by converting the sulfo groups partly to carboxyl groups. Japanese Laid-Open Patent No. 24177/77 discloses a process for producing an ion exchange membrane of a fluorocarbon polymer having both sulfo groups and carboxyl groups. The gist of this process is to convert sulfonyl halide groups to carboxyl groups through sulfino groups by reducing them with suitable reducing agents. Since, however, the sulfino groups are thermally and chemically unstable, the resulting ion exchange membrane gains a drastic increase in electric resistance. Moreover, it is sometimes necessary to perform an oxidation treatment in order to convert the unreacted sulfino groups to sulfo groups.

The present inventors have now found a novel process for converting sulfonyl halide groups bonded to the carbon atoms of a fluorocarbon polymer into carboxyl groups easily and efficiently. This process has made it possible to convert some or substantially all of the sulfonyl halide groups bonded to the carbon atoms of the fluorocarbon polymer into carboxyl groups.

SUMMARY OF THE INVENTION

According to this invention, there is provided a process for preparing a fluorine-containing polymer, which comprises subjecting a fluorine-containing polymer having sulfonyl halide groups bonded to it to an oxidation reaction at a temperature of not more than 250° C.

The invention also provides a process for electrolysis, which comprises using a membranous material of a fluorine-containing polymer having carboxyl groups as a diaphragm in electrolysis, especially in the electrolysis of alkali metal salts.

BRIEF DESCRIPTION OF THE DRAWINGS

In FIGS. 1 and 2, the symbol O refers to the material treated in accordance with this invention, and the symbol X, to the material not treated by the present invention.

DETAILED DESCRIPTION OF THE INVENTION

The fluorine-containing polymer having sulfonyl halide groups bonded to it includes, for example, a homopolymer of a fluorine containing vinyl monomer having a sulfonyl halide group or a copolymer of it with another monomer, and a homopolymer of a fluorine-containing vinyl monomer having a functional group readily convertible to a sulfonyl halide group (such as a thiol group, a sulfo group, its salt or ester) which is post-treated to convert it to a sulfonyl halide group, or a copolymer of it with another monomer.

Preferred fluorine-containing vinyl monomers having a sulfonyl halide group are listed below.

In the above formulae, Y is $-C_nF_mH_l-$ in which n, m and l are 0 or positive integers and satisfy divalent fluorinated hydrocarbon residues, and preferably, Y is $-(CF_2)_r-$ in which r is 0 or a positive integer, preferably 2. X represents a halogen atom, and p and q are 0 or positive integers.

Preferred fluorine-containing vinyl monomers having functional groups readily convertible to sulfonyl halide groups are those vinyl monomers illustrated above in which the $SO_2X$ group is replaced by a thiol group, a sulfo group, its salt or ester, etc.

Examples of preferred other monomers which are to be copolymerized with the above fluorine-containing vinyl monomers having a sulfonyl halide group or a group readily convertible to a sulfonyl halide group include fluorine-containing monomers such as vinyl fluoride, difluoroethylene, trifluoroethylene, perfluoropropylene, perfluoroalkyl vinyl ethers, and α,β,β'-trifluorostyrene.

The fluorine-containing polymer having a sulfonyl halide group bonded to it is preferably a perfluorocarbon polymer which has sulfonyl halide groups bonded to carbon atoms as pendant groups. The side chains of this polymer may have an etheric oxygen atom. Preferably, at least one fluorine atom is attached to the carbon atoms to which the sulfonyl halide groups are bonded. A copolymer of tetrafluoroethylene and a perfluoro(3,6-dioxa-4-methyl-7-octenesulfonyl halide) is an especially preferred fluorine-containing polymer having sulfonyl halide groups bonded to it. This polymer may contain a minor amount of another perfluoroalkyl vinyl ether sulfonyl halide as a copolymer component.

The halide in the sulfonyl halide groups bonded in the fluorine-containing polymer used in the present invention may be a fluoride, chloride, bromide or iodide, preferably the chloride and bromide.

In the oxidation treatment by the present invention of the fluorine-containing polymer having sulfonyl halide groups bonded to it, the polymer may be in any desired shape such as a membrane, granule, powder or fiber. It is especially preferred however to subject a membranous polymer to an oxidation treatment because it will result in an ion exchange membrane having suitability for use as an electrolytic diaphragm for alkali metal salts. In this case, the use of a membranous polymeric material having a thickness of at least 0.01 mm but not exceeding 2 mm and a size of at least 1 cm in at least one direction is suitable. In the fluorine-containing polymer to be subjected to oxidation reaction, the sulfonyl halide groups may be distributed uniformly, with a certain gradient, in a layer-like pattern, or stepwise in the cross-section of the polymer. Desirably, when the sulfonyl halide groups are hydrolyzed, the ion exchange capacity of the polymeric membrane is at least 0.1, preferably 0.3, milliequivalents/gram of dry membrane (H-type) but not exceeding 5 milliequivalents/gram of dry membrane (H-type).

In order to increase dimensional stability and mechanical strength, a membranous material of a fluorine-containing polymer having sulfonyl halide groups bonded to it may be lined with a porous sheet or cloth composed of polytetrafluoroethylene as a reinforcing material prior to its oxidation treatment.

In the present invention, there are two major embodiments of performing an oxidation treatment of the fluorine-containing polymer having sulfonyl halide groups.

In a first embodiment, the fluorine-containing polymer is subjected to an oxidation reaction in the liquid phase at a temperature of 30° C. to 250° C. In this first embodiment, any oxidizing agents generally used in oxidation can be used. They may be those which generate or contain atomic, molecular or radical oxygen under the reaction conditions used in this invention. Specific examples of the oxidizing agent are inorganic oxidizing agents such as oxygen and ozone, either as such or diluted with other gases, hydrogen peroxide, an aqueous solution of hydrogen peroxide, metal peroxides such as sodium peroxide, potassium peroxide, potassium permanganate, and sodium bichromate, sulfuric acid, persulfuric acid, nitric acid, chloric acid, perchloric acid and its salts, non-metallic peroxides such as fuming sulfuric acid or fuming nitric acid, and halogen gases containing chlorine or bromine. As organic peroxides, known hydrocarbon-type and fluorine-containing organic peroxides can be suitably used. Any organic peroxides which have a decomposition temperature of 30° to 250° C. and a half life of not more than 100 hours can be used. Specific examples of benzoyl peroxide, lauroyl peroxide, dicumyl peroxide, di-tertiary butyl peroxide, and ditrifluoromethyl peroxide. Among the above oxidizing agents, oxygen, oxygen diluted with another gas, ozone, ozone diluted with another gas, hydrogen peroxide, and an aqueous solution of hydrogen peroxide are preferred. These oxidizing agents can be used either alone or as a mixture.

When performing the oxidation reaction in the liquid phase in accordance with the first embodiment of the present invention, any reaction procedure taken usually in performing a liquid-phase oxidation reaction can be employed. If the oxidizing agent is gaseous, it is continuously or discontinuously introduced into a solvent containing the fluorine-containing polymer having sulfonyl halide groups. If the oxidizing agent is liquid, it is used either as such or as diluted with a solvent. If the oxidizing agent is solid, it is reacted at a temperature higher than its melting point, or as dissolved in a solvent. Preferably, the oxidation is carried out in the presence of a solvent.

Suitable solvents used in the liquid-phase oxidation reaction are those which promote the oxidation reaction of the sulfonyl halide groups, and may be any of those which have a high solubilizing power for oxygen, and trap halide radicals by, for example, inducing a hydrogen extraction reaction with the halide radicals formed from the sulfonyl halide groups during the reaction. Specific examples of the solvents are inorganic solvents such as water, acids, and aqueous solution of acidic, alkaline or neutral salts; and organic solvents, for example aliphatic hydrocarbons such as hexane, heptane, octane and decane, alcohols such as methanol, ethanol, propanol, butanol, amyl alcohol, and hexyl alcohol, ketones such as acetone and cyclohexanone, aldehydes such as acetaldehyde and butyraldehyde, carboxylic acids such as formic acid, acetic acid and propionic acid, esters such as methyl acetate, ethyl acetate, butyl acetate, and ethyl propionate, ethers such as diethyl ether, butyl ether, diglyme, triglyme and tetraglyme, aromatic compounds such as benzene, toluene, xylene, phenol and cumene, and the aforesaid compounds in which the hydrogen atoms are replaced partly by halogen, amino, cyano, and at times, by hydroxyl. The present invention can be performed by using at least one of these solvents. The object of this invention can be achieved also by using a perhalide such as carbon tetrachloride, tetrachloroethylene, Daifloil (a trademark for the product of Daikin Kogyo K.K., which is a trifluorochloroethylene oligomer) and Fomblin oil (a hexafluoropropylene oligomer with a molecular weight of 1500, a product of Monte-Edison) as a diluent. Preferred solvents are organic solvents composed of carbon, hydrogen and oxygen. Of these, aliphatic saturated monohydric alcohols containing 2 to 6 carbon atoms, such as ethanol, propanol, butanol, amyl alcohol and hexyl alcohol, are especially preferred.

The optimal conditions for performing the oxidation reaction in the first embodiment may be selected according to the type of the oxidizing agent, the solvent, and the type of the halogen atom in the sulfonyl halide group. Generally, when the reaction temperature is high, the sulfonyl halide groups or the fluorine-containing polymer containing the sulfonyl halide groups will decompose, or the resulting carboxyl groups may be decarboxylated. Hence, it is preferred to perform the oxidation reaction at a temperature of not more than 250° C. The reaction can proceed even at a temperature below 30° C., but the rate of the reaction will be reduced. Thus, such lower temperatures are industrially undesirable. The reaction pressure varies according to the solvent used, but may be any of reduced, atmospheric or elevated pressures which can maintain the reaction system liquid at the reaction temperature.

In a second embodiment of the present invention, the fluorine-containing polymer having sulfonyl halide groups bonded to it is subjected to an oxidation reaction at a temperature of 50° to 250° C. in the presence of a vapor of an organic compound at least having a carbon-hydrogen bond. In other words, the second embodiment is practiced in the vapor phase. In performing the oxidation reaction in accordance with the second embodiment, any of the reaction procedures which are usually performed in a continuous or batchwise heterogeneous oxidation reaction in a gas-solid system can be employed. Specifically, a gaseous mixture of the organic compound and the oxidizing agent is contacted with the fluorine-containing polymer having sulfonyl halide groups bonded to it at a temperature of 50° to 250° C. The object of this invention can be achieved at atmospheric, elevated or reduced pressure so long as the mixture is present in the gaseous state. But from the standpoint of the rate of reaction, the reaction pressure is preferably atmospheric pressure or an elevated pressure.

The oxidizing agent used in the second embodiment may be any of those which are generally used in an oxidation reaction, and they may be any of those which generate or contain atomic, molecular or radical oxygen under the reaction conditions of the present invention. Specific examples of the oxidizing agent are oxygen, ozone, hydrogen peroxide, nitric acid, the aforesaid agents which are diluted with other gases, and halogen gases such as chlorine or bromine containing water vapor. Of these, oxygen, ozone, hydrogen peroxide, either alone or as diluted with other gases are preferred. These oxidizing agents can be used either alone or as a mixture.

The organic compound having a carbon-hydrogen bond which is used in the second embodiment may be any of those which promote the oxidation reaction of the sulfonyl halide groups. Any organic compounds which react with halide radicals formed from the sulfonyl halide groups during the reaction by hydrogen extraction, and trap the halide radicals can be used in this invention. Examples of such compounds include aliphatic hydrocarbons such as hexane, heptane, octane and decane, alcohols such as methanol, ethanol, butanol and propanol, ketones such as acetone, methyl ethyl ketone and cyclohexanone, aldehydes such as acetaldehyde and butyraldehyde, carboxylic acids such as acetic acid and propionic acid, esters such as methyl acetate, ethyl acetate, butyl acetate and ethyl propionate, ethers such as ethyl ether, butyl ether, diglyme, triglyme and tetraglyme, aromatic compounds such as benzene, toluene, xylene, phenol and cumene, and the aforesaid compounds in which the hydrogen atoms are partly replaced by halogen, amino, cyano, hydroxyl, etc. Perhalogen compounds are excluded from these compounds.

Preferably, the organic compound having a carbon-hydrogen bond which is used in the second embodiment have a vapor pressure of at least 10 mmHg under the reaction conditions. If the vapor pressure is below this limit, the reaction requires a prolonged period of time, and is industrially disadvantageous. At least one of these organic compounds can be used. Organic compounds having oxygen in addition to a carbon-hydrogen bond are preferred. Aliphatic saturated monohydric alcohols having 2 to 6 carbon atoms are especially preferred.

The oxidation reaction conditions used in the second embodiment cannot be definitely determined because they may vary depending upon the types of the oxidizing agent, the organic compound, and the halogen atom of the sulfonyl halide group, the type of the fluorine-containing polymer containing sulfonyl halide groups, and the purpose of using the polymer obtained by the present invention. Generally, the reaction temperature is 50° to 250° C. If the reaction temperature is too high, the sulfonyl halide groups will decompose, or the fluorine-containing polymer will decrease in strength, change irreversibly in shape, or decompose. Furthermore, this will result in the decarboxylation of the carboxyl groups formed. Hence, it is preferred to perform the oxidation reaction at a temperature of not more than 250° C. The reaction proceeds even at below 50° C., but this is not industrially desirable because the rate of the reaction is slow.

The oxidation reaction may be performed under the irradiation of ionizing radiation effective for the activation of the reagents, such as ultraviolet light, $\alpha$-rays, $\beta$-rays, $\gamma$-rays, neutron rays, and X-rays. In particular, ultraviolet light and electron beams are effective for converting the sulfonyl halide groups on the surface layer of the fluorine-containing polymer. The use of ionizing radiation having strong penetrability, such as $\gamma$-rays, can induce a conversion reaction even at the interior of the fluorine-containing starting polymer. The use of ionizing radiations, however, may sometimes cause not only the activation of the reaction but also the deterioration of the base polymer. Hence, it is recommendable to choose suitable dosage rates and doses.

Generally, the suitable amounts of the organic compound (or solvent) and the oxidizing agent in the first and second embodiments are at least 1 mole per mole of the sulfonyl halide groups. When the reaction time can be made sufficiently long, the amounts may be less than 1 mole.

When the fluorine-containing polymer having carboxyl groups as an end product of this invention is used, for example, for the electrodialysis of a solution having such a low pH as will make it difficult to dissociate the carboxyl groups, complete conversion of the sulfonyl halide groups to carboxyl groups causes an increase in cell voltage. Hence, in such a case, too, the amounts of the organic compound (or solvent) and the oxidizing agent may be less than 1 mole per mole of the sulfonyl halide groups. On the other hand, in the case of using the final polymer for electrodialysis in an alkaline solution, the carboxyl groups dissociate sufficiently. Hence, the sulfonyl halide groups may be completely converted to carboxyl groups. In this case, therefore, the amounts of the organic compound (or solvent) and the oxidizing agent are preferably more than 1 mole per mole of the sulfonyl halide groups, and this will render the rate of reaction faster. The ratio of the organic compound (or solvent) to the oxidizing agent at the time of the reaction varies depending upon the reaction conditions, and cannot be definitely determined. Preferably, the organic compound (or solvent)/oxidizing agent mole ratio is from 1/100 to 100.

The two major embodiments for performing the oxidation reaction in accordance with this invention have been described above. The mechanism of converting the sulfonyl halide groups bonded to the fluorine-containing polymer into carboxyl groups by the oxidation reaction of this invention has not yet been fully elucidated. It is assumed however that since reaction of converting the sulfonyl halide groups into carboxyl groups proceeds with a strikingly good efficiency and at a fast rate of reaction, radical libreration, elimination of $SO_2$ and oxidation of residual polymer radicals takes place.

The ratio of sulfonyl halide groups converted to carboxyl groups and the distribution of the carboxyl groups in the final polymer obtained in this invention can be adjusted to various degrees by selecting the solvent, the organic compound or oxidizing agent, the reaction conditions, and the method of the reaction. For example, only the surface layer of the fluorine-containing polymer is reacted to convert the sulfonyl halide groups to carboxyl groups, or not only the surface layer but also the interior of the starting polymer may be reacted uniformly. Alternatively, the carboxyl groups converted from the sulfonyl halide groups are distributed with a certain gradient from the surface layer toward the interior. Or in a membranous material, the carboxyl groups may be present in the form of layer in the surface layer on one or both of its surfaces, or the sulfonyl halide groups may be converted over the entire part from one surface to the other.

The thickness of the layer in which the carboxyl groups are present is at least $0.05\mu$ from the surface of the fluorine-containing polymer (the sectional length in the case of a membranous or tubular article of the fluorine-containing polymer; the diameter in the case of granular or powdery article; the diameter of the constituent part in the case of a fiber). The thickness, however, can be selected properly according to the purpose of use of the fluorine-containing polymer having carboxyl groups as obtained by the present invention. When a membranous material of the fluorine-containing polymer as an end product of the present invention is used as a diaphragm for the electrolysis of alkali metal chlorides in which the pH of the anolyte solution is lowered so as to obtain a low cell voltage and to increase the current efficiency of chlorine generated at the anode compartment, it is preferred to convert the sulfonyl halide groups of the starting polymeric membrane to carboxyl groups at a portion extending from one surface of the membrane to at least $0.05\mu$ inside and up to 95% of the thickness of the membrane used, and direct the treated surface toward the cathode side in electrolysis.

These membranes may be melt-adhered or bonded by an adhesive to a membrane having sulfonyl halide groups and/or sulfo groups and/or phosphoric acid groups.

Where the membrane obtained by the present invention contains sulfonyl halide groups, they may be hydrolyzed to convert the remaining sulfonyl halide groups to sulfo groups.

The fluorine-containing polymers having carboxyl groups obtained by the present invention can be used without any restriction in the fields in which the same type of polymers have been used. For example, the product in the form of powder, granule or fibers has superior chemical resistance under severe oxidizing conditions under which conventional hydrocarbon-type ion exchangers cannot be used. Thus, in long-time use, no reduction in performance is observed. When the resulting membrane has water permeability, it can be used as a filtration membrane. Or those having a certain pore size distribution can be used as an ultrafiltration membrane. Or they can be used as a substitute for an asbestos diaphragm in the electrolysis of alkali metal salts to electrolyze the alkali metal salts at a higher rate of decomposition and with a higher current efficiency. Furthermore, compact diaphragms non-permeable to water, that is ion exchange membranes, are very useful as diaphragms for the electrolysis of alkali metal salts, cation exchange membranes for ordinary electrodialysis, electrolytes for fuel cells, and diaphragms for electrochemical cells. They can also be used for diffusion dialysis and pressure dialysis. In short, the membranous products of this invention can be applied without restriction to systems and apparatus in which conventional chargeable membranous materials are used.

The following Examples illustrate the present invention specifically. It should be understood that the scope of the invention is in no way limited by these examples.

Conversion of sulfonyl halide groups to carboxyl groups in these examples was confirmed by elemental analysis, fluorescent X-ray analysis, IR spectrum analysis, etc. In particular, absorption bands at 1790 cm$^{-1}$ and 1680 cm$^{-1}$ which reversibly appear when the fluorine-containing polymer having carboxyl groups in accordance with this invention is sufficiently immersed in hydrochloric acid and an aqueous solution of sodium hydroxide, respectively, are assigned to the carboxyl groups. (The absorption band at 1790 cm$^{-1}$ is considered to be an absorption band corresponding to H-type carboxyl groups, and the absorption band at 1680 cm$^{-1}$ is considered to be an absorption band corresponding to the Na-type carboxyl groups.)

When the product is an ion exchange membrane, the electric resistance of the membrane is measured between 3.5 N—NaCl and 6.0 N—NaOH (the treated surface of the membrane was contacted) at 85° C., and an alkali metal salt is electrolyzed, unless otherwise indicated. The electrolysis is carried out by using a saturated aqueous solution of sodium chloride as an anolyte, a titanium lath material coated with ruthenium oxide and titanium oxide as an anode, a mesh-like mild iron as a cathode. Water is added to the cathode compartment, and an aqueous solution of an alkali metal hydroxide in a certain concentration is obtained. The current density is 30 A/dm$^2$ unless otherwise specified. The temperature of the electrolytic solution is 80° to 90° C. The concentrations of Ca$^{2+}$ and Mg$^{2+}$ in the saturated sodium chloride solution used as the anolyte solution are both less than 1 ppm.

Examples 1 to 15 refer to the liquid-phase oxidation reaction, whereas Examples 16 to 29, to the vaporphase oxidation reaction.

EXAMPLE 1

A membranous material having a thickness of 0.2 mm and composed of a copolymer of tetrafluoroethylene (monomer A) and perfluoro(3,6-dioxa-4-methyl-7-octenesulfonyl fluoride)(monomer B) in a mole ratio of about 7:1, which had an ion exchange capacity upon hydrolysis of 0.91 milliequivalent/gram of dry membrane (H-type) was hydrolyzed for 16 hours at 60° C. in a mixture consisting of 600 parts of water, 400 parts of dimethyl sulfoxide and 15 parts of sodium hydroxide to afford an ion exchange membtane having Na sulfonate groups.

The membrane was dipped in 60% nitric acid at 60° C. for 16 hours to convert the sulfonate groups completely to an H-form. The membrane was then dried, and reacted at 130° C. for 75 hours in a bath consisting of 1 part of phosphorus pentachloride and 2 parts of phosphorus oxychloride. After the reaction, the product was washed with carbon tetrachloride, and dried under reduced pressure.

To examine the resulting membrane, the reflective infrared spectrum of this membrane was measured. It was found that the absorption band at 1060 cm$^1$ observed in the sulfonic acid-type membrane disappeared, and a strong absorption band corresponding to the sulfonyl chloride group was observed at 1420 cm$^{-1}$.

The membrane having sulfonyl chloride groups and the membrane having H-type sulfo groups were put into a 1-liter separable flask, and sufficiently dipped in n-butyl alcohol. Air was introduced into the flask at a rate of 580 cc/min. through a porous glass plate fitted to the bottom of the flask, dispersed uniformly in the n-butyl alcohol, and also applied uniformly to the surface of the membrane. With stirring at 110° C. for 3 hours, the membranes were subjected to oxidation reaction. The membranes were then washed with methanol and water, and dried under reduced pressure. To examine their surface structures, the reflective infrared spectrum of the treated membranes were measured. No appreciable difference was seen in the sulfonic acid-type membrane before and after the treatment. In the sulfonyl chloride-type membrane, the absorption band at 1420 cm$^{-1}$ ascribable to sulfonyl chloride totally disappeared, and a new absorption band at 1790 cm$^{-1}$ was observed. This absorption band is assigned to carboxyl group.

These membranes were immersed for 16 hours at 60° C. in a methanol solution containing 10% of sodium hydroxide, washed with water, and dried under reduced pressure. The reflective infrared spectra of the treated membranes were measured. The absorption band at 1790 cm$^{-1}$ observed when the sulfonyl chloride-type membrane was used disappeared. Instead, a new absorption band was observed at 1680 cm$^{-1}$.

These membranes were each dipped at room temperature for 30 minutes in a dye solution prepared by dissolving crystal violet in a concentration of 1% in a 0.5 N aqueous solution of hydrochloric acid containing 10% of ethanol. Then, the membranes were washed with water and cut by a microtome. The degree of dyeing was examined by a microscope. It was found that the membrane obtained by treating the sulfonic acid-type membrane was uniformly dyed deep green in its entirety, whereas in the membrane obtained by treating the sulfonyl chloride-type membrane, portions inwardly of both surfaces to a depth of 20μ were not dyed at all, and the remainder was dyed deep green.

This dyeing test shows that in the sulfonyl chloride type membrane, the oxidation treatment converted the sulfonyl chloride groups are present in portions inwardly of both surfaces to a depth of 20μ into carboxyl groups.

The properties of the membrane hydrolyzed with 10% sodium hydroxide were measured, and a saturated sodium salt solution was electrolyzed using this membrane. The results are given in Table 1.

For comparison, the sulfonyl chloride-type membrane was treated in n-butyl alcohol at 110° C. for 3 hours without introducing air. The treated membrane was subjected to hydrolysis treatment at 60° C. for 16 hours in a methanol solution containing 10% of sodium hydroxide. The electric resistance of the membrane was found to be 450 ohms-cm$^2$, and the current efficiency could not be measured.

Table 1

| Properties | Membrane having sulfo groups (blank) | Membrane of the invention |
|---|---|---|
| Electric resistance (ohms-cm$^2$) | 1.95 | 2.25 |
| Exchange capacity (milliequivalents/gram of dry membrane, H form) | 0.91 | 0.85 |
| Water content (%) | 17 | 12 |
| NaOH concentration (N) | 7.50 | 7.50 |
| Current efficiency (%) | 49 | 93 |
| Amount of NaCl in HaOH (calculated as 48% NaOH) (ppm) | 238 | 18 |

EXAMPLE 2

A plain weave cloth having 50 wraps and 50 wefts each being of 400 denier and made of polytetrafluoroethylene was interposed between a 0.1 mm thick sheet of the same copolymer as used in Example 1 (whose exchange capacity upon hydrolysis is 0.91 milliequivalent/gram of dry membrane of H-form) and a 0.05 mm thick sheet of the same copolymer (whose exchange capacity upon hydrolysis is 0.67 milliequivalent/gram of dry membrane of H-form). The assembly was consolidated under heat and pressure to form a reinforced membrane. The resulting membrane was hydrolyzed in the same way as in Example 1 to form an ion exchange membrane having Na sulfonate groups, then converted to an H-type ion exchange membrane, and reacted with phosphorus pentachloride-phosphorus oxychloride to form a membrane having sulfonyl chloride groups.

The membrane was washed with carbon tetrachloride, and then set in a stainless steel oxidation device equipped with stainless steel clamping pieces for mounting the membrane, an opening for introduction of air and a stainless steel plate for dispersing the air. The membrane was mounted such that the sheet having a smaller exchange capacity on hydrolysis (a capacity of 0.67 milliequivalent/gram of dry membrane) would be oxidized with the air. Kerosene was added so as to immerse the membrane and air in the apparatus sufficiently. While introducing the air at a rate of 1000 cc per minute, the membrane was reacted at 110° C. for 10 hours. After the treatment, the membrane was immersed in a methanol solution containing 10% of sodium hydroxide at 60° C. for 16 hours.

Using the resulting membrane with its oxidation-treated surface directed toward the cathode, an electrolysis test was conducted. It was found that when 7 N sodium hydroxide was formed, the current efficiency was 95%. When a membrane obtained by hydrolyzing the membrane having sulfonyl chloride groups was used in this electrolysis test, the current efficiency at the time of forming 7 N sodium hydroxide was 75%. Furthermore, the electric resistances of the membranes were measured at 25° C. in a 3.5 N sodium chloride solution at a pH of 0.5 and 10.0 respectively. It was found that the membrane not subjected to the treatment of this invention had an electric resistance of 7.2 and 7.8 ohms-cm² respectively, whereas the membrane treated by the process of this invention showed an electric resistance of 580 and 8.1 ohms-cm² respectively. Thus, it was found that within this pH range, the degree of dissociation of the ion exchange groups varies widely.

EXAMPLE 3

The same polytetrafluoroethylene plain weave cloth as used in Example 2 was interposed between a 0.1 mm thick sheet of the same copolymer as used in Example 1 and a 0.05 mm thick sheet of the same copolymer (both of which had an exchange capacity of 0.91 milliequivalent/gram of dry membrane (H-type) upon hydrolysis). The assembly was consolidated under heat and pressure to form a reinforced membrane.

In the same way as in Example 1, this membrane was converted to an H-type ion exchange membrane. The membrane was then treated at 130° C. for 83 hours in a mixture consisting of 1 part of phosphorus pentabromide and 2 parts of phosphorus tribromide to form a membrane having sulfonyl bromide groups. The membrane was washed with ethylene dichloride, and the amount of bromine present was measured by fluorescent X-ray analysis. The result agreed substantially with the value calculated from its exchange capacity. This shows that the sulfo groups were almost completely converted to sulfonyl bromide groups.

The resulting membrane was placed in a 1-liter separable flask, and a mixture consisting of 5 parts of propionic acid and 1 part of commercially available hydrogen peroxide solution (35%) was added until the membrane got completely soaked. Oxidation reaction was performed at 100° C. for 10 hours with stirring. Then, the membrane was hydrolyzed under the same conditions as in Example 1.

The resulting membrane was dyed in the same way as in Example 1 to examine the distribution of carboxyl groups in its cross section. It was found that portions inwardly of both surfaces to a depth of 5μ were not dyed. The current efficiency at the time of forming 8 N sodium hydroxide was 94%.

EXAMPLE 4

A 0.3 mm membrane composed of the same copolymer of tetrafluoroethylene and perfluoroalkyl vinyl ether sulfonyl fluoride as used in Example 1 (whose exchange capacity was 0.83 milliequivalent/gram of dry membrane (H-type)) was used, and converted completely to a sulfonic acid type in the same way as in Example 1. The membrane was heated at 130° C. for 78 hours in a dispersion of 10 parts of phosphorus pentachloride in 80 parts of a trifluorochloroethylene oligomer (Daifloil #1, a trademark for a product of Daikin Kogyo Kabushiki Kaisha, with a molecular weight of 500). After the cooling, the membrane was taken out, washed with water to remove the excess of the oligomer, and dried under reduced pressure. The reflective infrared absorption spectrum of this membrane showed a strong absorption of sulfonyl chloride at 1420 cm$^{-1}$, and the absorption of sulfonic acid at 1060 cm$^{-1}$ substantially disappeared. This membrane had an electric resistance of 38,000 ohms-cm² in 1.0 N hydrochloric acid.

Only one surface of this membrane was treated under the conditions shown in Table 2 using the same apparatus as used in Example 2. The treated membrane was immersed at 60° C. for 16 hours in a 10% methanol solution of sodium hydroxide to hydrolyze the sulfonyl chloride groups remaining on the back surface and interior of the membrane to sodium sulfonate groups.

The properties of the resulting membrane were measured, and a saturated sodium chloride solution was electrolyzed at a current density of 35 A/dm² using this membrane. For comparison (Blank in Table 2), the electrolysis was performed also by using the membrane having sodium sulfonate groups which was not subjected to oxidation treatment. In electrolysis, the treated surface of the membrane was directed toward the cathode.

A dyeing test using crystal violet was performed in the same way as in Example 1 using the membrane having the sulfonyl chloride groups hydrolyzed, and the cross section of the membrane was observed microscopically.

The results are shown in Table 2.

Table 2

| Treatment | Electric resistance (ohms-cm²) | Exchange capacity (milliequivalents/ g of dry membrane (H-type)) of the non-reinforced membrane | Water content (non-reinforced membrane) (%) | Concentration of NaOH (N) | Current efficiency (%) | Amount of NaCl in NaOH (calculated as 48% NaOH) (ppm) | Thickness of the undyed portion (μ) |
|---|---|---|---|---|---|---|---|
| Immersed in a mixture of 10 parts of 30% H₂O₂ solution and 1 part of formic acid at 60° C. for 16 hours | 2.85 | 0.75 | 13 | 6.00 | 92 | 23 | 5 |
| Immersed in a 5% chloroform solution of perbenzoic acid at 100° C. for 24 hours | 2.55 | 0.78 | 13 | 6.00 | 90 | 25 | 10 |
| Immersed in a mixture consisting of 16 parts of water, 40 parts of pyridine and 41 parts of copper sulfate, and air was introduced with stirring at 100° C. for 8 hours | 2.30 | 0.80 | 14 | 6.00 | 93 | 18 | 25 |

Table 2-continued

| Treatment | Electric resistance (ohms-cm$^2$) | Exchange capacity (milliequivalents/ g of dry membrane (H-type)) of the non-reinforced membrane | Water content (non-reinforced membrane) (%) | Concentration of NaOH (N) | Current efficiency (%) | Amount of NaCl in NaOH (calculated as 48% NaOH (ppm) | Thickness of the undyed portion ($\mu$) |
|---|---|---|---|---|---|---|---|
| Blank | 2.10 | 0.83 | 15 | 6.00 | 59 | 258 | — |

EXAMPLE 5

Trifluorochloroethylene (monomer A) and perfluoro(3,6-dioxa-4-methyl-7-octene sulfonyl fluoride) (monomer B) were emulsion-copolymerized in a customary manner. The monomer A unit/monomer B unit mole ratio of the resulting copolymer was about 14/1. The resulting copolymer was washed with water, dried under reduced pressure, and molded under heat and pressure to form a 0.2 mm thick membrane. The membrane was hydrolyzed in a 10% methanol solution of sodium hydroxide at 60° C. for 10 hours, and its exchange capacity was measured. It was found to have an exchange capacity of 0.5 milliequivalent/gram of dry membrane (H-type). The resulting sulfonyl fluoride-type membrane was reacted under reflux for 20 hours in a mixture of 20 parts of carbon tetrachloride and 1 part of anhydrous hydrazine to convert it to a sulfohydrazide type. The membrane was further washed with carbon tetrachloride, and reacted with a 1% carbon tetrachloride solution of iodine at 90° C. for 18 hours in an autoclave. From the exchange capacity of this membrane upon hydrolysis and the fluorescent X-ray analysis values, it was found that about 85% of the sulfohydrazide groups were converted to sulfonyl iodide groups.

The resulting membrane having sulfonyl iodide groups was subjected to oxidation reaction at 110° C. for 8 hours in the same reaction apparatus as in Example 1. Diglyme was used as a solvent, and nitrogen containing 3% of ozone was used as an oxidizing agent. This gaseous mixture had been obtained as follows: Air containing ozone obtained form an ozone generator was introduced into a trap of liquid oxygen to obtain liquid ozone. The liquid ozone was purified by distilling it twice. Nitrogen was blown into the liquid ozone to form nitrogen gas containing 3% of ozone.

The membrane subjected to oxidation reaction was immersed at 60° C. for 9 hours in a 10% methanol solution of sodium hydroxide to hydrolyze it. Its reflective infrared absorption spectrum showed a strong absorption band at 1680 cm$^{-1}$ ascribable to carboxyl, and a shoulder absorption band ascribable to sulfo group at 1060 cm$^{-1}$. The current efficiency was 90% at the time of obtaining 7 N sodium hydroxide. The membrane had an electric resistance of 2.0 ohms-cm$^2$.

When the membrane having sulfonyl iodide groups were directly hydrolyzed, the resulting membrane showed a current efficiency of 52% at the time of obtaining 7 N sodium hydroxide, and an electric resistance of 1.8 ohms-cm$^2$.

EXAMPLES 6 TO 14

Various membranes having sulfonyl halide groups were subjected to oxidation reaction using the solvents, oxidizing agents and reaction conditions shown in Table 3. The conversion of the sulfonyl halide groups to carboxyl groups are examined by reflective infrared spectroscopy. When a gaseous oxidizing agent was used, the same reaction apparatus as used in Example 1 was used. When a liquid or solid oxidizing agent is used, an ordinary separable flask not having a porous plate was used. The results are shown in Table 3.

For comparison, the reflective infrared spectrum of the membrane obtained by Example 13 without using an oxidizing agent (air) was measured. No conversion of the sulfonyl halide groups to carboxyl groups was noted.

Table 3

| Example | Sulfonyl halide group-containing membrane | Reaction conditions Temperature (°C.) | Time (hrs.) | Solvent | Oxidizing agent | Presence of carboxyl groups |
|---|---|---|---|---|---|---|
| 6 | Membrane of Example 1 | 80 | 5 | Chlorobenzene | Air (1000 cc/min.)(*1) | Yes |
| 7 | " | 110 | 8 | Cumene | Air (6000 cc/min.) | Yes |
| 8 | 0.1 mm thick sheet of Example 3 | 100 | 10 | n-Butyl acetate | Ozone-nitrogen mixture used in Example 5(*2) | Yes |
| 9 (comparison) | Membrane of Example 1 | 110 | 15 | Fomblin oil | Air (500 cc/min.) | No |
| 10 | " | 110 | 15 | Mixture of 1 part of n-butanol and 10 parts of Fomblin oil | " | Yes |
| 11 | Membrane of Example 5 | 100 | 13 | Water | 90% Nitric acid | Yes |
| 12 (comparison) | Membrane of Example 1 | 110 | 10 | Tetrachloroethylene | Air (800 cc/min.) | No |
| 13 | " | 110 | 10 | Mixture of 10 parts of tetrachloroethylene and 2 parts of benzaldehyde | " | Yes |
| | | | | | Di-tertiary butyl | |

Table 3-continued

| Example | Sulfonyl halide group-containing membrane | Reaction conditions Temperature (°C.) | Time (hrs.) | Solvent | Oxidizing agent | Presence of carboxyl groups |
|---------|-------------------------------------------|---------------------------------------|-------------|--------------|-------------------|-----------------------------|
| 14      | "                                         | 90                                    | 20          | Acetophenone | peroxide (3%)(*3) | Yes                         |

(*1)The parenthesized figures show the amounts introduced at the time of oxidation reaction,
(*2)The amount of the mixture introduced was 600 cc/min.,
(*3)Weight percent based on the solvent.

EXAMPLE 15

A mixture of 1 part of the copolymer obtained in Example 5 and 2 parts of calcium carbonate was ball-milled, and molded into a 0.3 mm thick membrane in a customary manner. The sheet obtained was immersed at 60° C. for 5 hours in a 10% methanol solution of sodium hydroxide to hydrolyze sulfonyl fluoride groups to sulfo groups. The sheet was further immersed at 50° C. for 20 hours in 6 N hydrochloric acid to extract calcium carbonate, to form a water-permeable membrane having sulfo groups. The water permeability of the resulting membrane of Na type was measured and found to be 0.011 cc/cm$^2$.hr.cmH$_2$O. (The resulting membrane was designated as "membrane I".)

The membrane resulting from the extraction of calcium carbonate was converted to a water-permeable membrane having sulfonyl chloride groups in the same way as in Example 1. Using the same apparatus as used in Example 1, the membrane was reacted at 100° C. for 5 hours while introducing air at a rate of 400 cc per minute into n-butanol. The oxidation-treated membrane was hydrolyzed in the same manner as described above, and the water-permeability of the membrane of Na type was measured, and found to be 0.010 cc/cm$^2$.hr.cmH$_2$O. (The resulting membrane was designated as "membrane II".)

Using each of these membranes, sodium chloride was eletrolyzed in the same apparatus as described hereinabove in the body of the specification. Saturated sodium chloride solution was added to the anode compartment, and no water was added to the cathode compartment. The current density was adjusted to 20 A/dm$^2$, and the temperature of the cathode compartment was adjusted to 80° C. The decomposition ratio of sodium chloride was maintained at 50%, and the concentration of sodium hydroxide obtained in the cathode compartment and the current efficiency were measured. With membrane I, the concentration of the sodium hydroxide was 11.3%, and the current efficiency was 93%. With membrane II, the concentration of sodium hydroxide was 12.1%, and the current efficiency was 97%.

EXAMPLE 16

Sulfonic acid-type cation exchange membranes, Nafion XR-110 and Nafion XR-415 (trademarks for products of E. I. du Pont de Nemours & Co.) were each immersed in 5 N hydrochloric acid at room temperature for 5 hours to form H-type ion exchange membranes. These ion exchange membranes were washed with water, and dried for 15 hours in a vacuum dryer. These membranes were further treated at 120° C. for 15 hours in a 3:7 (by weight) mixture of phosphorus pentachloride and phosphorus oxychloride. The treated membranes were washed under reflux with carbon tetrachloride for 5 hours.

After washing, a part of the XR-110 membrane was cut away, and the reflective infrared spectrum of the cut portion was measured. It was found that the absorption band at 1060 cm$^{-1}$ observed in the sulfonic acid-type membrane disappeared, and a strong absorption band ascribable to a sulfonyl chloride group appeared at 1420 cm$^{-1}$.

These membranes before and after the treatment were dyed at room temperature for 15 hours in a dye solution consisting of 1 g of crystal violet, 20 cc of methanol and 100 cc of 0.5 N hydrochloric acid solution. The membranes before the treatment were dyed deep green, but the membranes after the treatment were not dyed at all. This result demonstrates that the treatment with phosphorus pentachloride and phosphorus oxychloride caused the ion-exchange sulfo groups to be converted almost completely to sulfonyl chloride groups.

The resulting membranes having sulfonyl chloride groups which had been prepared from Nafion XR-110 and Nafion XR-415 were set in the same stainless steel reactor as used in Example 2 so that only one surface of each of these membranes would be able to be contacted with reaction reagents. In the meantime, air at 25° C. was passed at a flow rate of 20 cc/min. through a gas scrubbing bottle (vapor saturator) filled with n-butanol heated at 100° C. to obtain air containing a saturated vapor of n-butanol at 100° C. The air containing n-butanol was pre-heated to 110° C. and introduced into the reactor kept at 110° C. In this condition, the reaction was continued for 5 hours.

After the reaction, the membranes were taken out. The treated XR-415 membrane was immersed in a 10% methanol solution of sodium hydroxide at 60° C. for 10 hours to hydrolyze the remaining sulfonyl chloride groups. On the other hand, the treated XR-110 membrane was dried under reduced pressure, and its reflective infrared spectrum was measured. It was found that in the spectrum of the treated surface, the absorption band at 1420 cm$^{-1}$ ascribable to the sulfonyl chloride group disappeared, and a new absorption band acribable to the carboxyl group appeared at 1790 cm$^{-1}$. In the spectrum of the other surface, the absorption band of sulfonyl chloride at 1420 cm$^{-1}$ remained with substantially the same intensity as that before treatment, and no absorption of carboxyl was observed.

The treated XR-415 membrane after hydrolysis in a 10% methanol solution of sodium hydroxide was dyed in a dyeing bath at room temperature for 12 hours with stirring. The membrane was cut by a microtome, and the resulting thin piece was observed by an optical microscope. It was found that a portion inwardly of the treated surface to a depth of 30$\mu$ was not dyed at all, but the remainder was dyed deep green. Thus, the sulfo groups in the portion with a thickness of 30$\mu$ were converted to carboxyl groups, and the sulfo groups remained in the remaining portion.

The electric resistance of the treated XR-415 membrane was measured. The membrane was also set in an electrolytic cell with the treated surface directed toward the cathode, and sodium chloride was electrolyzed. The current efficiency at the time of obtaining sodium hydroxide was measured. It was found that the membrane had an electric resistance of 2.3 ohms-cm$^2$, and the current efficiency at the time of obtaining 6 N sodium hydroxide was 93%. The cell voltage was 3.65 V. When 6 N sodium hydroxide was produced continuously for three months, neither a decrease in current efficiency nor an increase in cell voltage was noted.

For comparison, the XR-415 membrane not treated in accordance with this invention was used. The cell voltage was 3.50 V, and the current efficiency at the time of producing 6 N sodium hydroxide was 53%.

EXAMPLE 17

A sulfonic acid-type cation exchange membrane, Nafion XR-425 (a trademark for a product of E. I. duPont de Nemours & Co.), was treated in the same way as in Example 16 to form a membrane having sulfonyl chloride groups. The resulting membrane was converted into a membrane having carboxyl groups by the same method as in Example 16 in the same apparatus as used in Example 16. The vapor saturator filled with methanol was maintained at 40° C., and the temperature of the reactor and the pre-heater were adjusted to 130° C. As an oxidizing agent, a 1:1 (by volume) mixture of air and nitrogen was passed at a rate of 10 cc/min. at room temperature.

The resulting membrane was treated in the same way as in Example 16 to hydrolyze the sulfonyl chloride groups. The resulting membrane was subjected to a dyeing test. The membrane was set in an electrolytic cell, and the current efficiency at the time of obtaining sodium hydroxide was measured. The results of the dyeing test showed that at a portion inwardly of the treated surface to a depth of 10$\mu$, the sulfonyl chloride groups were converted to carboxyl groups. The current efficiency at the time of continuously producing 8 N sodium hydroxide was 91%. When the operation was continued for 6 months, the current efficiency was still 91%, and no decrease in current efficiency with time was observed.

The Nafion XR-425 not treated by the present invention showed a current efficiency of 63% at the time of producing 8 N sodium hydroxide.

EXAMPLE 18

A sulfonic acid type cation exchange resin, XR-501 (a trademark for a product of DuPont), was pulverized to form granules with a diameter of 0.1 to 0.3 mm. To convert the granules completely to the H-type, the granules were immersed in conc. nitric acid at room temperature for 20 hours, washed with water, and dried under reduced pressure.

100 g of the dried granules were sufficiently mixed with 50 g of powdery phosphorus pentachloride. The mixture was placed into a stainless steel autoclave, and reacted in an oil bath at 160° C. for 5 hours. After the reaction, the contents of the autoclave were poured into ice water. The granules were collected by filtration, washed twice with water, and dried under reduced pressure. The granules were immersed at room temperature for 10 hours in a solution for hydrolyzing sulfonyl chloride groups as in Example 16. The exchange capacities of the granules before and after the reaction with phosphorus pentachloride and the hydrolyzed granules were each measured in a customary manner, and found to be 0.83, 0.00, 0.83 meq/g-dry resin (H-type), respectively. It was found that the reaction with phosphorus pentachloride caused the sulfo groups to be converted almost completely to sulfonyl chloride groups.

A glass tube with a diameter of 3 cm equipped with a nozzle at both ends was packed with the resin granules after reaction with phosphorus pentachloride, and the entire glass tube was heated to 110° C. in an electric furnace. Air saturated with benzene at 50° C. through the same vapor saturator as used in Example 16 and pre-heated to 110° C. was fed from the nozzle at one end, and the gas after the reaction was discharged from the nozzle at the other end. The reacted granules were immersed at room temperature for 20 hours in the same sulfonyl chloride group-hydrolyzing bath as used in Example 16. The resulting granules were immersed at room temperature for 15 hours in the same dye solution as used in Example 16, and washed with water. The dyed granules were cut off by a microtome, and the resulting thin piece was observed by an optical microscope. It was found that a portion inwardly of the surface to a depth of about 5$\mu$ was dyed pale green, and a portion from that point to the center was dyed deep green. Thus, the layer from the surface to a depth of 5$\mu$ contained sulfo groups and carboxyl groups, and the layer from that depth to the center contained sulfo groups.

Figure 1:
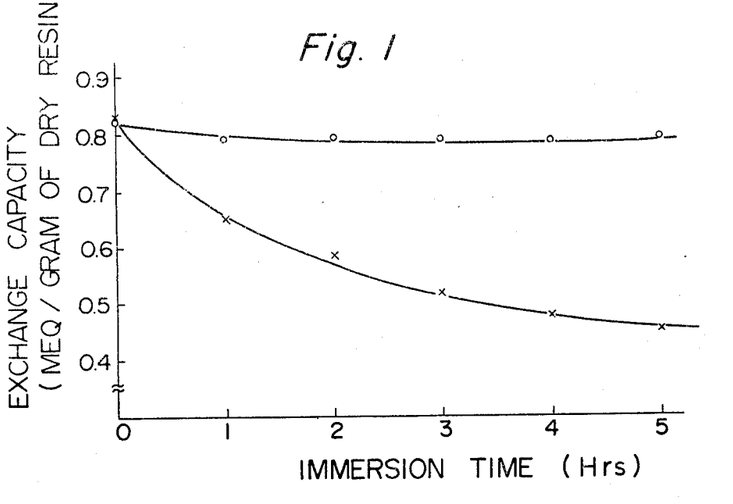
FIG. 1 shows variations in the exchange capacity of the granular product described in Example 18 with immersion time in a saline solution containing lauryl pyridinium chloride.
Figure 2:
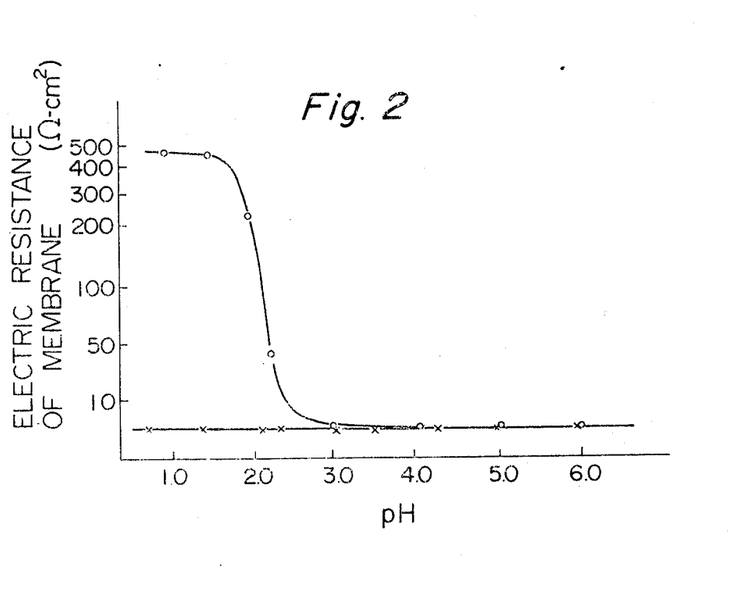
FIG. 2 shows the pH dependence of the electric resistance of the membrane described in Example 19.

The granules of this invention and granules not treated with the present invention (XR-501 was pulverized to a diameter of 0.1 to 0.3 mm) were immersed with stirring at 30° C. for a predetermined period of time in a 5 N aqueous solution of sodium chloride containing 100 ppm of lauryl pyridinium chloride at a pH of 2.0. The apparent exchange capacity by the adsorption of a lauryl pyridinium ion was measured. The results are shown in FIG. 1. The point at which the immersion time is 0 shows the exchange capacity before immersion.

From the results obtained, it is seen that the granules of this invention scarcely permit the adsorption of a lauryl pyridinium ion under conditions such that carboxyl groups scarcely dissociate, and there is hardly any pollution by giant ions of organic matter.

EXAMPLE 19

A 400 cc stainless steel autoclave charged with 200 g of trifluorochloroethylene and 230 mg of azobisisobutyronitrile was further charged with trifluorochloroethylene under a pressure of 10 kg/cm$^2$ and 50 g of perfluoro(3,6-dioxa-4-methyl-7-octene sulfonyl fluoride). The autoclave was cooled with liquid nitrogen, and degassed under reduced pressure. The temperature was raised to 70° C., and the polymerization was continued for 48 hours at the same temperature. After the reaction, 20 g of a white copolymer was obtained.

The copolymer was compression-molded at 250° C. to obtain a 0.2 mm thick membrane. The sulfonyl fluoride groups of the membrane were hydrolyzed with the same solution as used in Example 16, and its exchange capacity was measured. It was found to have an exchange capacity of 1.01 meq/g of dry membrane (H-type).

A double-walled reactor consisting of an inside tube of quartz and an outside tube of glass was provided. The membrane before the hydrolysis was set between the outside and inside tubes in such a manner that only its one surface would be exposed to ultraviolet ray. An ultraviolet lamp (SHL-100 UV, a product of Toshiba Kabushiki Kaisha) was set in the inside tube of the reactor. The ultraviolet lamp was illuminated while feeding a mixture of methyl ethyl ketone and air (1:2 by partial pressure) at a flow rate of 30 cc/min. into the chamber in which the membrane was placed. The reaction was performed for 20 hours. The reaction temperature was maintained at 170° C.

After the reaction, the remaining sulfonyl fluoride groups were hydrolyzed in a customary manner, and the pH dependence of the electric resistance of the membrane was measured using a 3.5 N aqueous solution of sodium chloride at room temperature. The results showed that weakly acidic groups which dissociated at a pH between 2.0 and 3.0 formed.

For comparison, the same pH dependence was determined on the membrane not treated by the present invention. No pH dependence was noted.

EXAMPLE 20

Nafion XR-110 membrane having sulfonyl chloride groups which was obtained in Example 16 was subjected to reducing treatment at 80° C. for 5 hours in a 2% aqueous solution of sodium sulfite, and washed with water, and dried. A part of the treated membrane was cut away, and its reflective infrared spectrum was measured. It was found that the absorption of the sulfonyl chloride group at 1420 cm$^{-1}$ disappeared, and absorption bands at 930 cm$^{-1}$ and 1010 cm$^{-1}$ ascribable to the sulfinate group appeared newly. Thus, the sulfonyl chloride groups were converted almost completely to sulfinate groups.

The dried membrane was reacted in 500 cc of carbon tetrachloride containing 10 g of bromine at room temperature for 10 hours. The treated membrane was washed with carbon tetrachloride at room temperature. A part of the treated membrane was cut away, and its reflective infrared spectrum was measured. It was found that the absorption band at 930 cm$^{-1}$ ascribable to the sulfinate group disappeared completely, and an absorption band at 1410 cm$^{-1}$ ascribable to the sulfonyl bromide group appeared newly.

The resulting membrane having sulfonyl bromide groups was set in the same stainless steel reactor as used in Example 16 adapted to treat only one surface of the membrane. To one of the two nozzles of the reactor was fitted a preheater heated at 100° C., and nitrogen, 35% hydrogen peroxide aqueous solution and n-hexane were added by means of metering pumps at a flow rate of 10 cc/min, 0.5 cc/min, and 1.0 cc/min. The gaseous mixture obtained was introduced into the reactor, and the gases after the reaction were discarded from the other nozzle. The temperature of the reactor was maintained at 100° C., and the reaction was continued for 10 hours. After the reaction, the membrane was taken out and immersed at 60° C. for 5 hours in the same hydrolyzing solution as used in Example 16 to hydrolyze the remaining sulfonyl bromide groups into sulfo groups. The reflective infrared spectrum of the membrane was determined, and a saturated sodium chloride solution was electrolyzed. According to the results of the reflective infrared spectrum, an absorption band at 1680 cm$^{-1}$ corresponding to the sodium carboxylate group was observed strongly, and scarcely any absorption band ascribable to the sulfo group at 1060 cm$^{-1}$ was observed. In the reflective infrared spectrum of the untreated surface, an absorption at 1680 cm$^{-1}$ was not observed, and an absorption band ascribable to the sulfo group at 1060 cm$^{-1}$ was observed.

The electrolysis test was performed while the treated side of the membrane was being directed toward the cathode. The cell voltage was 3.51 V, and the current efficiency at the time of producing 6 N sodium hydroxide was 92%. When the electrolysis test was continued for three months, neither an increase in cell voltage nor a decrease in current efficiency was noted.

EXAMPLE 21

The sulfonyl fluoride groups of the membrane obtained in Example 19 were hydrolyzed, and by using the method of Example 16, a membrane having sulfonyl chloride groups was formed. The resulting membrane was suspended in a separable flask, and the flask was immersed in an oil bath. Nitrogen containing 2% by volume of ozone and saturated with a vapor of diethyl ether at room temperature was introduced through a nozzle of the separable flask at a flow rate of 20 cc/min. The oil bath was heated, and the temperature of the inside of the separable flask was maintained at 200° C. The reaction was thus performed for 20 hours. The resulting membrane was immersed at 50° C. for 6 hours in the same hydrolyzing solution as used in Example 16.

The resulting membrane was subjected to the dyeing test and the electrolysis test for electrolyzing a saturated aqueous solution of sodium chloride was performed. The dyeing test was performed by dyeing the membrane in the same dye solution as used in Example 16 at room temperature for 15 hours, cutting away a thin piece from the dyed sample, and observing the thin piece by an optical microscope. It was found that the membrane was not dyed at all, and substantially all of the sulfonyl chloride groups were converted to carboxyl groups.

The membrane not treated by the present invention was dyed deep green in its entire cross section.

A saturated aqueous solution of sodium chloride was electrolyzed using the membrane treated in accordance with this invention. The current efficiency at the time of producing 6 N sodium hydroxide was 92%.

The cell voltage depended on the pH of the anolyte solution, and when the pH of the anolyte solution was 2.0 and 4.0, the cell voltage was 4.80 V, and 3.50 V, respectively.

With the membrane not treated in accordance with the present invention, the current efficiency at the time of obtaining 6 N sodium hydroxide was 56%. The cell voltage was 3.46 V, and no change in cell voltage was noted even when the pH of the anolyte solution was charged to 2.0 and 4.0.

The nitrogen containing 2% by volume of ozone used in this Example was obtained in the same way as in Example 5.

EXAMPLE 22

A plain weave cloth having 50 warps and 50 wefts with a size of 400 denier which was made of polytetrafluoroethylene was interposed between a 0.1 mm thick sheet and a 0.05 mm thick sheet both of which had an exchange capacity upon hydrolysis of 0.77 meq/gram of dry membrane (H-type) and was composed of a copolymer of tetrafluoroethylene (monomer A) and perfluoro(3,6-dioxa-4-methyl-7-octene) sulfonyl fluoride (monomer B) with a monomer A/monomer B mole ratio of about 9/1. The assembly was consolicated under heat and pressure to form a reinforced membrane.

In the same way as in Example 16, the resulting membrane was hydrolyzed, and then made into an H-type ion exchange membrane using hydrochloric acid. It was dried under reduced pressure, and then set in the same stainless steel reactor as used in Example 16 which was adapted to react only with one surface of the membrane. The temperature of the reactor was raised to 180° C. while feeding nitrogen saturated with a vapor of phosphorus pentachloride at 150° C. at a flow rate of 20 cc/min. through one nozzle of the reactor. The reaction was performed at this temperature for 3 hours. After the reaction, the membrane was taken out, and a part of it was cut away. The cut piece was subjected to the dyeing test, and its electric resistance in 1 N hydrochloric acid at room temperature was measured. As a result, the sulfonyl fluoride groups were converted to sulfonyl chloride groups at a portion inwardly of the surface reacted with phosphorus pentachloride to a depth of 1μ, and the membrane had an electric resistance of 200 ohms-cm$^2$.

A beaker filled with the remainder of the membrane and 10 g of propionaldehyde was placed in a 500 cc autoclave, and air at 3 atmospheres was introduced into the autoclave at room temperature. The autoclave was then sealed, and immersed in an oil bath. The reaction was continued at 150° C. for 5 hours. After the reaction, the remaining sulfonyl chloride groups were hydrolyzed, and using the resulting membrane, a saturated sodium chloride solution was electrolyzed. The current efficiency at the time of obtaining 6 N sodium hydroxide was 92%, and the cell voltage was 3.82 V. Even when the electrolysis test was continued for three months, neither a decrease in current efficiency nor an increase in cell voltage was observed.

In the electrolysis test of the membrane not treated by the process of this invention, the cell voltage was 3.80 V and the current efficiency was 73% at the time of obtaining 6 N sodium hydroxide.

EXAMPLES 23 TO 29

The Nafion XR-415 membrane having sulfonyl chloride groups used in Example 16 was subjected to vapor-phase oxidation treatment under the conditions shown in Table 4. The properties of the membrane are shown in Table 4. Unless otherwise specified, the reactor used was the same as that used in Example 16, and the electrolysis was performed by the method and apparatus described hereinabove in the body of the specification.

It can be seen from the results obtained in Examples 27 and 28 (comparison) that the vapor-phase oxidation treatment in accordance with this invention essentially requires the presence of the oxidizing agent and the organic compound at the time of reaction.

Table 4

| Example | Oxidizing agent Type | Amount (cc/min.) | Organic compound Type | Saturator temperature | Temperatures of the reactor and pre-heater (°C.) | Reaction time (hours) | Electric resistance of membrane (ohms-cm$^2$) | Current efficiency (concentration of NaOH obtained) | Cell voltage (V) |
|---|---|---|---|---|---|---|---|---|---|
| 23 | Air | 10 | Propionic acid | 120 | 160 | 9 | 2.8 | 92% (7N) | 3.80 |
| 24 | Air | 30 | Pentanal | 80 | 120 | 5 | 2.3 | 91% (6N) | 3.58 |
| 25 | Air | 15 | Ethyl acetate | 40 | 100 | 4 | 2.2 | 90% (6N) | 3.49 |
| 26 | 1% ozone/N$_2$(*1) | 40 | 1-chloropentane | 80 | 180 | 13 | 2.5 | 92% (6N) | 3.65 |
| 27 (comparison) | Air | 20 | None | — | 150 | 20 | 2.0 | 65% (6N) | 3.56 |
| 28 (comparison) | Nitrogen | 20 | n-butanol | 80 | 110 | 5 | 120 | — | — |
| 29 (*2) | Commercially available nitric acid | 0.3 | Cyclohexane (0.8 cc/min.) | — | 180 | 12 | 2.6 | 89% (6N) | 3.68 |

(*1)Obtained in the same manner as in Example 5.
(*2)Using the same reactor as used in Example 20, commercially available nitric acid and cyclohexane were fed in the liquid state into the preheater at a flow rate of 0.3 cc/min. and 0.8 cc/min. The mixture was gasified, and used to oxidize the membrane.

What we claim is:

1. A process for preparing a fluorine-containing polymer having carboxyl groups, which comprises subjecting a fluorine-containing polymer having sulfonyl halide groups bonded to it to an oxidation reaction in the liquid phase at a temperature of 30° to 250° C.

2. The process of claim 1 wherein the fluorine-containing polymer is a perfluorocarbon polymer.

3. The process of claim 2 wherein the perfluorocarbon polymer is a copolymer of tetrafluoroethylene and perfluoro(3,6-dioxa-4-methyl-7-octene sulfonyl halide).

4. The process of claim 1 wherein the sulfonyl halide groups are sulfonyl chloride or sulfonyl bromide groups.

5. The process of claim 1 wherein the fluorine-containing polymer is in the form of a membrane.

6. The process of claim 1 wherein the oxidation reaction is carried out in the presence of a solvent.

7. The process of claim 6 wherein the solvent is an organic solvent consisting of carbon, hydrogen and oxygen.

8. The process of claim 7 wherein the organic solvent is an aliphatic saturated monohydric alcohol containing 2 to 6 carbon atoms.

9. The process of claim 1 wherein the oxidation reaction is carried out using an aqueous solution of hydrogen peroxide or an oxygen-containing gas as an oxidizing agent.

10. The process of claim 1 wherein the fluorine-containing polymer having sulfonyl halide groups is a homopolymer of a fluorine-containing vinyl monomer having a sulfonyl halide group bonded thereto or a copolymer of the vinyl monomer with a monomer copolymerizable therewith or a homopolymer of a fluorine-containing vinyl monomer having a functional group readily convertible to a sulfonyl halide group or a copolymer of the functional group containing vinyl monomer with a monomer copolymerizable therewith.

11. The process of claim 1 wherein the fluorine-containing polymer is a fluorocarbon monomer having the groups —Y—SO$_2$X bonded thereto wherein Y is —C$_n$F$_m$H$_l$—, in which n, m and l are 0 or positive integers and X is a halogen atom.

12. The process of claim 1 wherein the fluorine-containing polymer having sulfonyl halide groups is a polymer of a fluorine-containing vinyl monomer selected from the group consisting of:

wherein Y is —C$_n$F$_m$H$_l$—, in which n, m and l are 0 or positive integers and X is a halogen atom and p and q are 0 or positive integers.

13. The process of claim 12 in which Y is —(CF$_2$)$_r$— in which r is 0 or a positive integer.

* * * * *